(12) United States Patent
Lyall

(10) Patent No.: US 11,986,092 B2
(45) Date of Patent: May 21, 2024

(54) METHOD AND APPARATUS FOR FLANGE CLIP FOR SUPPORT CHANNEL

(71) Applicant: International Technical Coatings, Inc., Phoenix, AZ (US)

(72) Inventor: Wayne Lyall, Phoenix, AZ (US)

(73) Assignee: International Technical Coatings, Inc., Phoenix, AZ (US)

( * ) Notice: Subject to any disclaimer, the term of this patent is extended or adjusted under 35 U.S.C. 154(b) by 0 days.

(21) Appl. No.: 18/065,757

(22) Filed: Dec. 14, 2022

(65) Prior Publication Data

US 2023/0397726 A1    Dec. 14, 2023

Related U.S. Application Data

(63) Continuation of application No. 17/159,834, filed on Jan. 27, 2021, now Pat. No. 11,622,627.

(60) Provisional application No. 62/967,692, filed on Jan. 30, 2020.

(51) Int. Cl.
*F16B 11/00*    (2006.01)
*A47B 96/06*    (2006.01)
*F16B 12/10*    (2006.01)

(52) U.S. Cl.
CPC ............ *A47B 96/06* (2013.01); *F16B 11/004* (2013.01); *F16B 12/10* (2013.01); *Y10T 24/44983* (2015.01)

(58) Field of Classification Search
None
See application file for complete search history.

(56) References Cited

U.S. PATENT DOCUMENTS

| | | | |
|---|---|---|---|
| 3,863,873 A | 2/1975 | Cushing | |
| 5,299,509 A | 4/1994 | Ballard | |
| 5,769,248 A * | 6/1998 | Johnson | A47F 5/0807 |
| | | | 248/220.21 |
| 5,836,112 A | 11/1998 | Lindale et al. | |
| 5,836,121 A | 11/1998 | Hofman | |
| 6,079,365 A | 6/2000 | Medlin et al. | |
| 6,100,942 A | 8/2000 | Hollenbaugh et al. | |
| 11,369,198 B2 | 6/2022 | Systma | |
| 2011/0173921 A1 * | 7/2011 | Orchard | E04F 13/18 |
| | | | 52/712 |
| 2012/0266562 A1 * | 10/2012 | Woolf | E04C 3/07 |
| | | | 52/846 |
| 2020/0370291 A1 | 11/2020 | Sputo | |
| 2022/0025637 A1 * | 1/2022 | Stahl | E04B 1/2403 |

FOREIGN PATENT DOCUMENTS

EP        3827708 A1 *   6/2021        A47B 96/021

* cited by examiner

*Primary Examiner* — Steven M Marsh
(74) *Attorney, Agent, or Firm* — Noblitt & Newson, PLLC

(57) ABSTRACT

Method and apparatus for a flanged clip for a support channel according to various aspects of the present technology comprise a flanged end clip bonded to an end of a support channel. The flanged clip may have one or more surfaces configured to provide a stronger bonding between the flanged clip and the support channel.

11 Claims, 6 Drawing Sheets

US 11,986,092 B2

METHOD AND APPARATUS FOR FLANGE CLIP FOR SUPPORT CHANNEL

CROSS-REFERENCES TO RELATED APPLICATIONS

This application is a continuation of U.S. patent application Ser. No. 17/159,834 filed on Jan. 27, 2021, which claims the benefit of U.S. Provisional Patent Application No. 62/967,692, filed Jan. 30, 2020, and incorporates the disclosure of each application by reference. To the extent that the present disclosure conflicts with any referenced application, however, the present disclosure is to be given priority.

BACKGROUND OF TECHNOLOGY

Shelving and rack storage systems often provide storage space in bays positioned between vertical members. Shelves or racks may be positioned within a bay to facilitate the storage of items and may be modular or otherwise designed for non-permanent placement within a bay so that storage space may be configured and reconfigured to account for changing conditions, such as the amount of storage space required at any given time or to account for various sized packages, boxes, and articles to be stored. Modular racks and shelves, or mesh decks, are often lightweight to allow for easier placement. However, strength of a shelf may be sacrificed as weight is removed.

One or more horizontal support channels may be coupled to a mesh deck and span the distance between opposing vertical members connected by horizontal support structures to provide increased load bearing capacity to mesh decks positioned within a bay. Horizontal support structures come in many forms such as tubes, channels, I-beams, and the like. The horizontal support channels are configured to rest upon the horizontal support structures. Given the varying types of horizontal support structures available, there is a need for decking systems that can be used with any type of horizontal support structure.

SUMMARY OF THE TECHNOLOGY

Methods and apparatus for a flanged clip for a support channel according to various aspects of the present technology comprise a flanged end clip bonded to an end of a support channel. The flanged clip may have one or more surfaces configured to provide a stronger bonding between the flanged clip and the support channel.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of materials, support structures, and the like, which may carry out a variety of functions. In addition, the present technology may be practiced in conjunction with any number of material handling systems, support devices, or load bearing systems, and the system described is merely one exemplary application for the technology. Further, the present technology may employ any number of conventional metal forming manufacturing processes such as stamping, rolling, machining, and welding.

Method and apparatus for a flanged clip for a support channel according to various aspects of the present technology may operate in conjunction with any suitable support system and/or material. Various representative implementations of the present technology may be applied to any rack-based shelving system for material handling or product storage.

Figure 1:
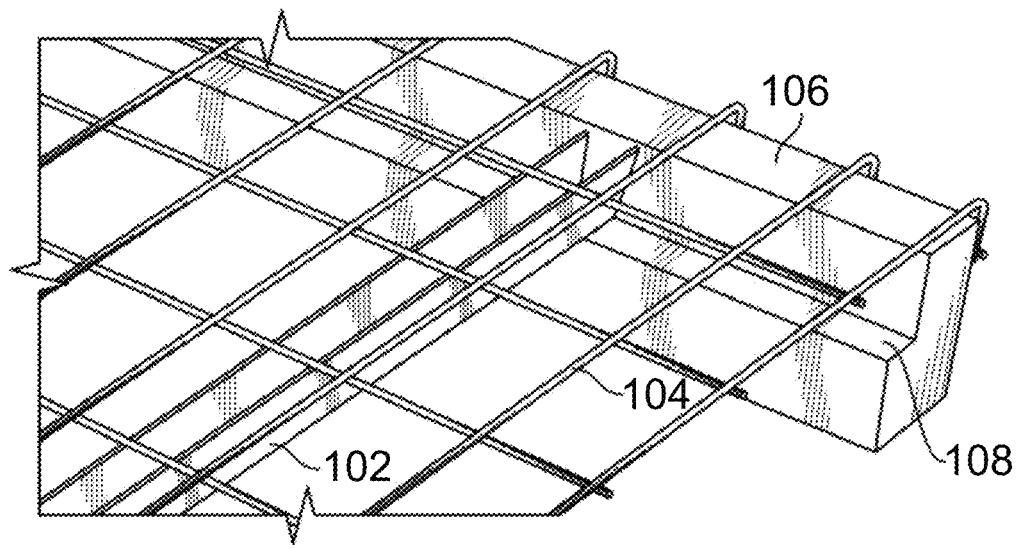
FIG. 1 representatively illustrates a perspective view of a prior art decking system with a standard U-channel oriented upward.
Figure 2:
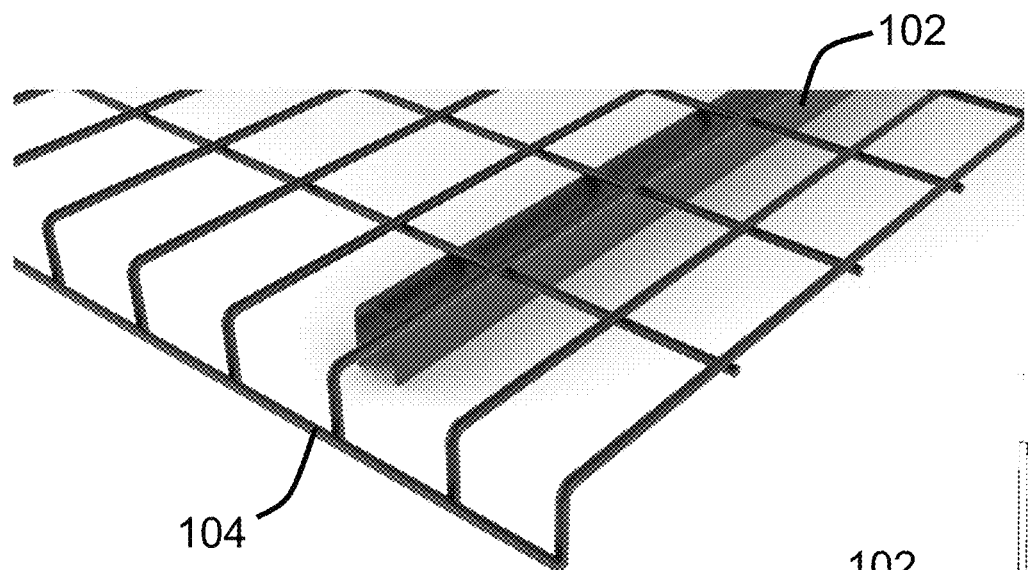
FIG. 2 representatively illustrates a perspective view of a prior art decking system with a standard U-channel oriented downward.
Figure 3:
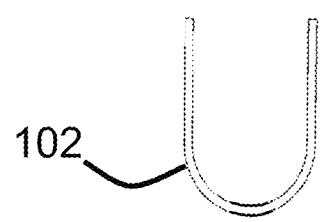
FIG. 3 representatively illustrates an end view of the prior art U-channel shown in FIGS. 1 and 2.

Referring now to FIGS. 1-3, a prior art decking system may comprise a horizontal support channel 102 positioned under a mesh deck 104 to support a load placed on the mesh deck 104. The horizontal support channel 102 may comprise one or more structural members coupled to a first side of a mesh deck 104 to allow an end of the decking system to be positioned on a horizontal support rail 106 such that objects may be placed on a second side of the mesh deck 104. The ends of the horizontal support channel 102 are configured to rest on or be coupled to a ledge 108 of the horizontal support rail 106.

The horizontal support channel 102 may comprise a generally "U" shaped body wherein the pair of sidewalls are separated from each other by a gap and are substantially parallel to each other along at least a portion of a height of the sidewalls. A lower portion extending between the pair of sidewalls may form a curved surface that extends upwardly away from a lowermost center portion. The horizontal support channel 102 may also be oriented in either an upward direction (FIG. 1) or downward direction (FIG. 2) relative to a surface of the mesh deck 104. The horizontal support channel 102 may comprise other shapes configured to support a load placed on the mesh deck 104.

The horizontal support channel 102 may comprise any suitable material such as steel, iron, aluminum, plastic, and/or composite. For example, in one embodiment, the horizontal support channel 102 may comprise a grade 50-65 steel having a thickness of between about one thirty-second of an inch and about three sixteenths of an inch.

The sidewalls may comprise any suitable dimensions. The dimensions may be determined according to a desired application or load bearing requirements. For example, as a height of the sidewalls increases, the horizontal support channel 102 may have an increased load carrying capacity. Similarly, a width of the gap between the sidewalls may be determined according to any suitable criteria such as loading requirements or a dimensional pattern of the mesh deck 104. For example, in one embodiment, the sidewalls may comprise a height of between about one-half inch to about two and a half inches with a gap between the sidewalls of between about one-quarter of an inch to about two inches.

Figure 4:
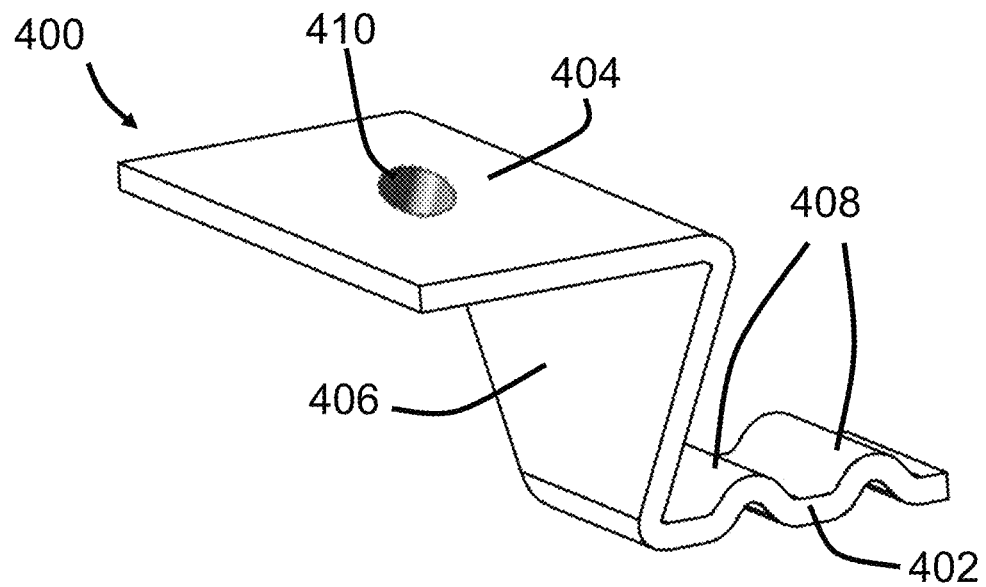
FIG. 4 representatively illustrates a perspective view of a flange clip in accordance with an exemplary embodiment of the present technology.
Figure 5:
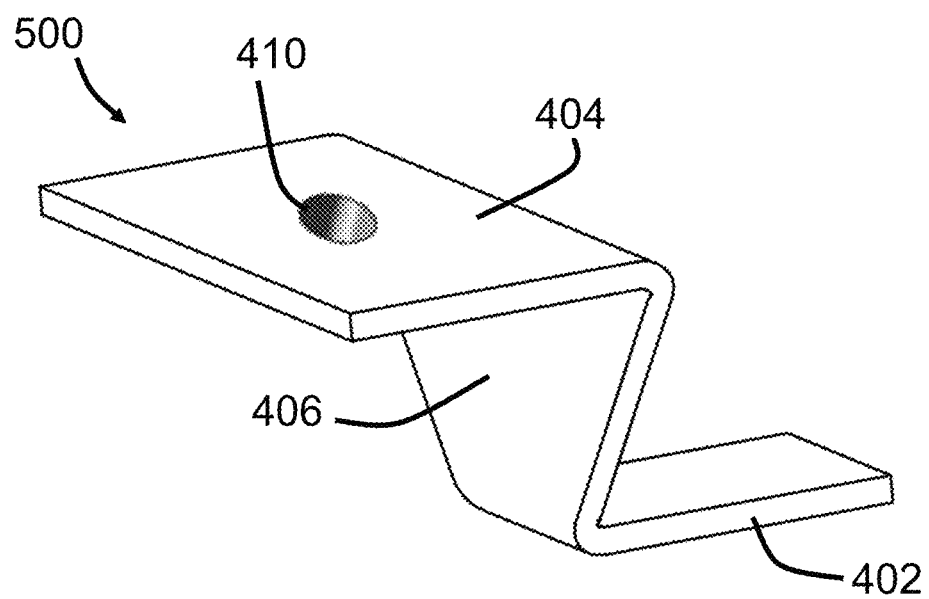
FIG. 5 representatively illustrates a perspective view of an alternative embodiment of a flange clip in accordance with an exemplary embodiment of the present technology.
Figure 6:
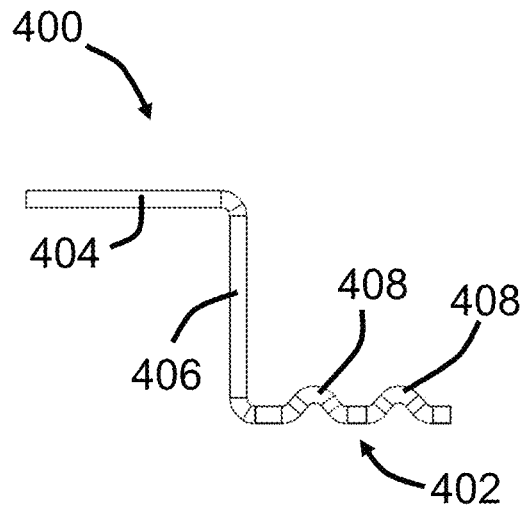
FIG. 6 representatively illustrates a left side view of the flange clip shown in FIG. 4 in accordance with an exemplary embodiment of the present technology.
Figure 7:
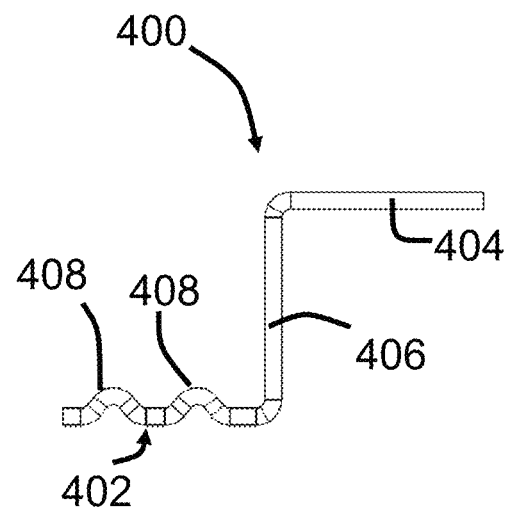
FIG. 7 representatively illustrates a right side view of the flange clip shown in FIG. 4 in accordance with an exemplary embodiment of the present technology.
Figure 8:
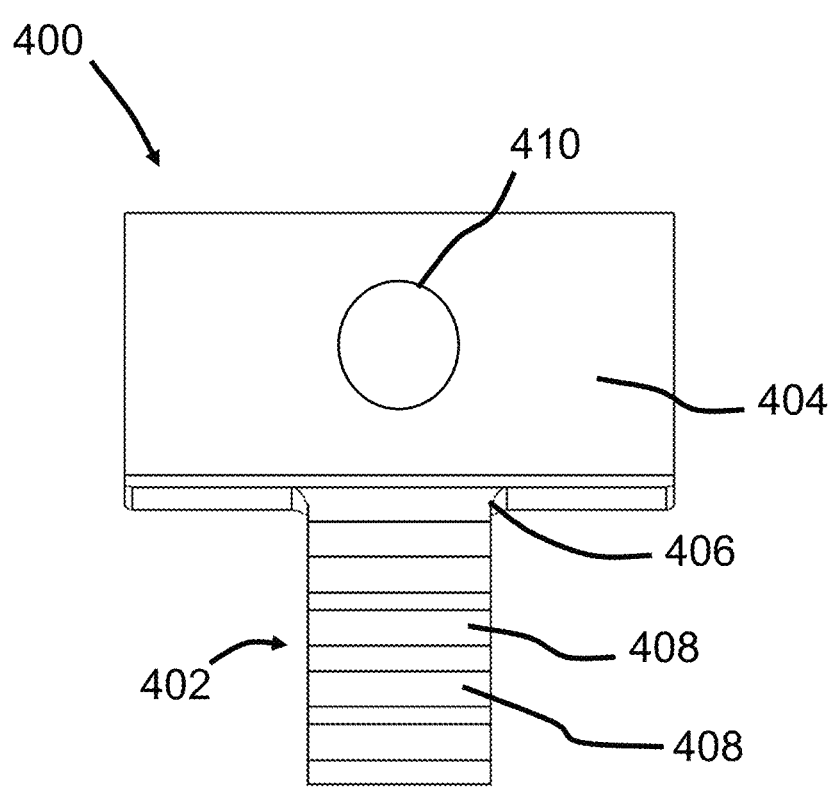
FIG. 8 representatively illustrates a top view of the flange clip shown in FIG. 4 in accordance with an exemplary embodiment of the present technology.
Figure 9:
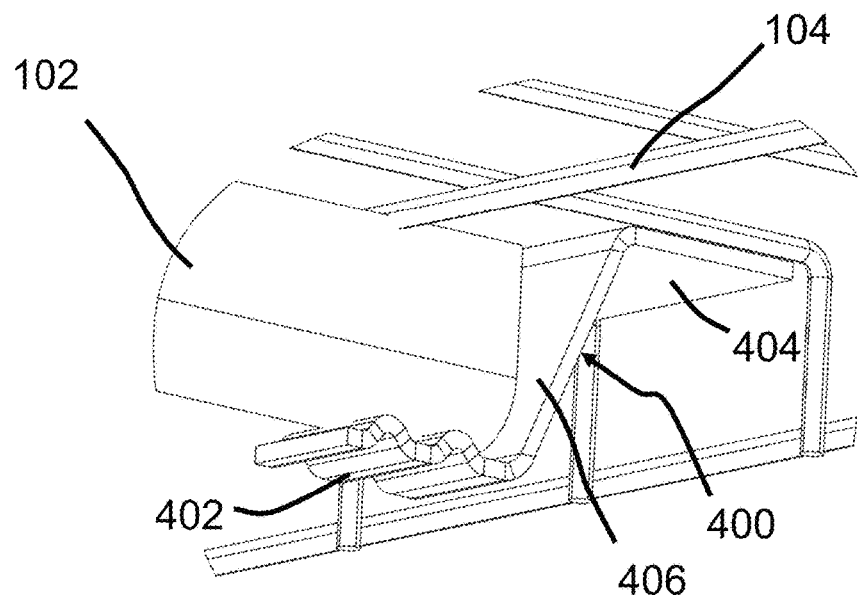
FIG. 9 representatively illustrates the flange clip shown in FIG. 4 integrated into a decking system in accordance with an exemplary embodiment of the present technology.
Figure 10:
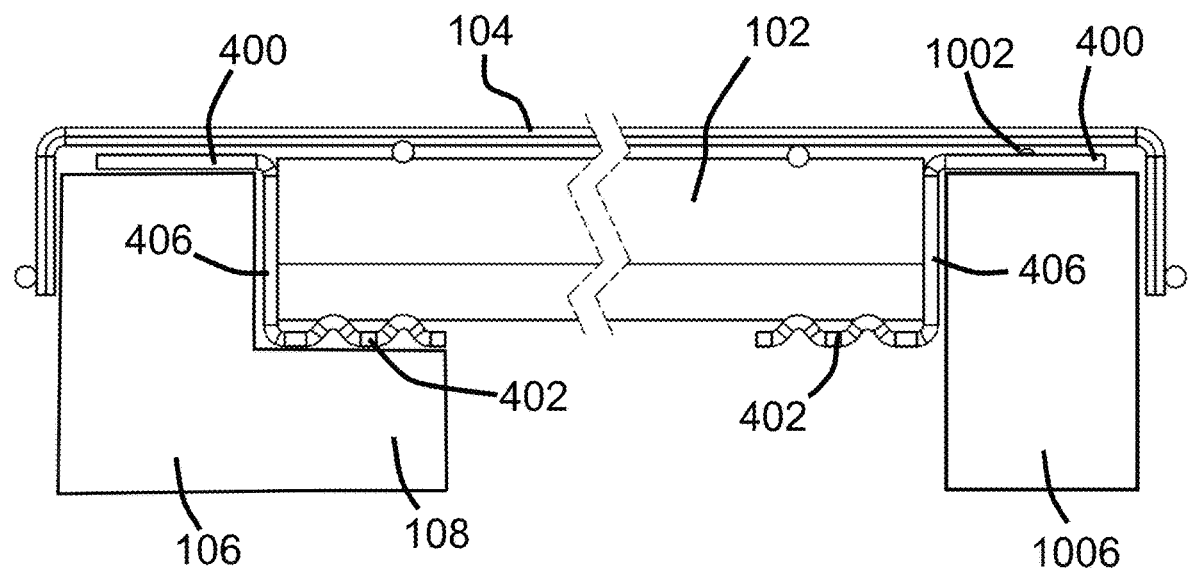
FIG. 10 representatively illustrates a side view of the decking system shown in FIG. 9 in accordance with an exemplary embodiment of the present technology.
Figure 11:
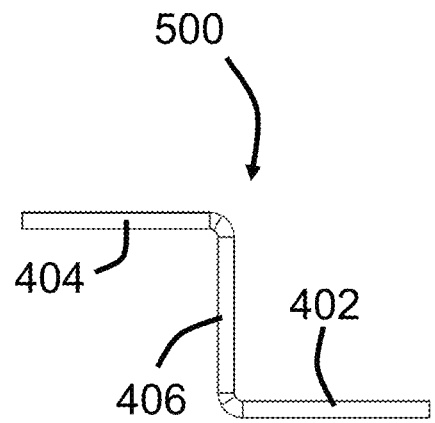
FIG. 11 representatively illustrates a left side view of the flange clip shown in FIG. 5 in accordance with an exemplary embodiment of the present technology.
Figure 12:
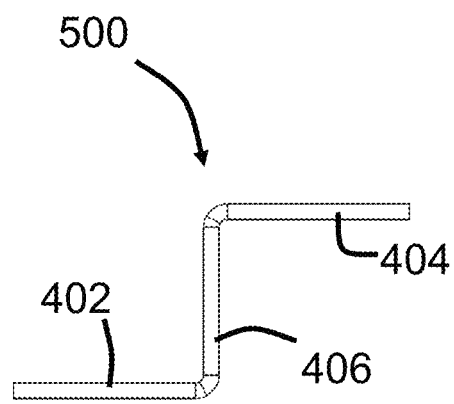
FIG. 12 representatively illustrates a right side view of the flange clip shown in FIG. 5 in accordance with an exemplary embodiment of the present technology.
Figure 13:
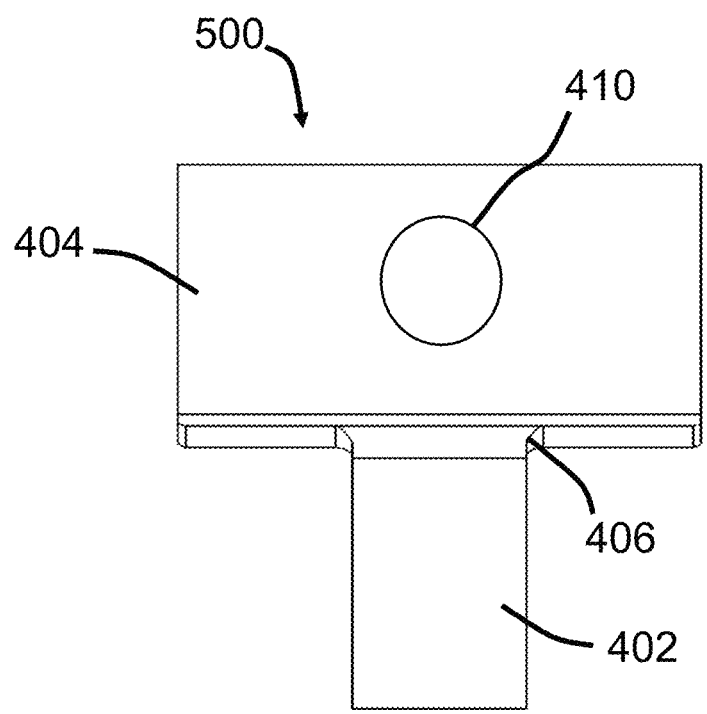
FIG. 13 representatively illustrates a top view of the flange clip shown in FIG. 5 in accordance with an exemplary embodiment of the present technology.
Figure 14:
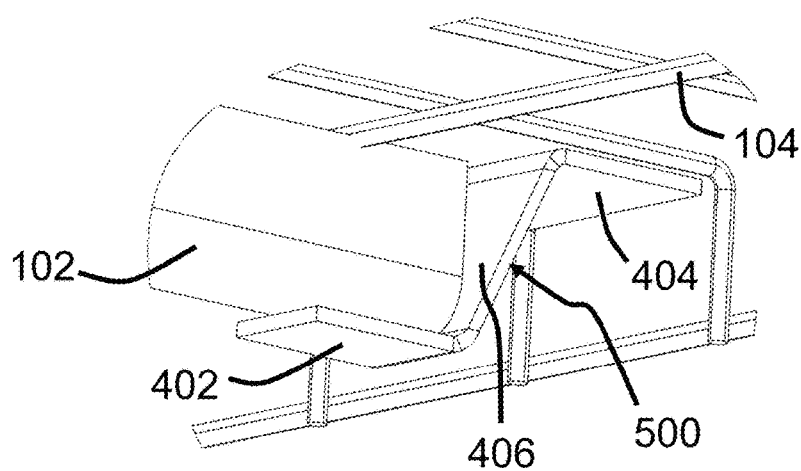
FIG. 14 representatively illustrates the flange clip shown in FIG. 4 integrated into a decking system in accordance with an exemplary embodiment of the present technology.
Figure 15:
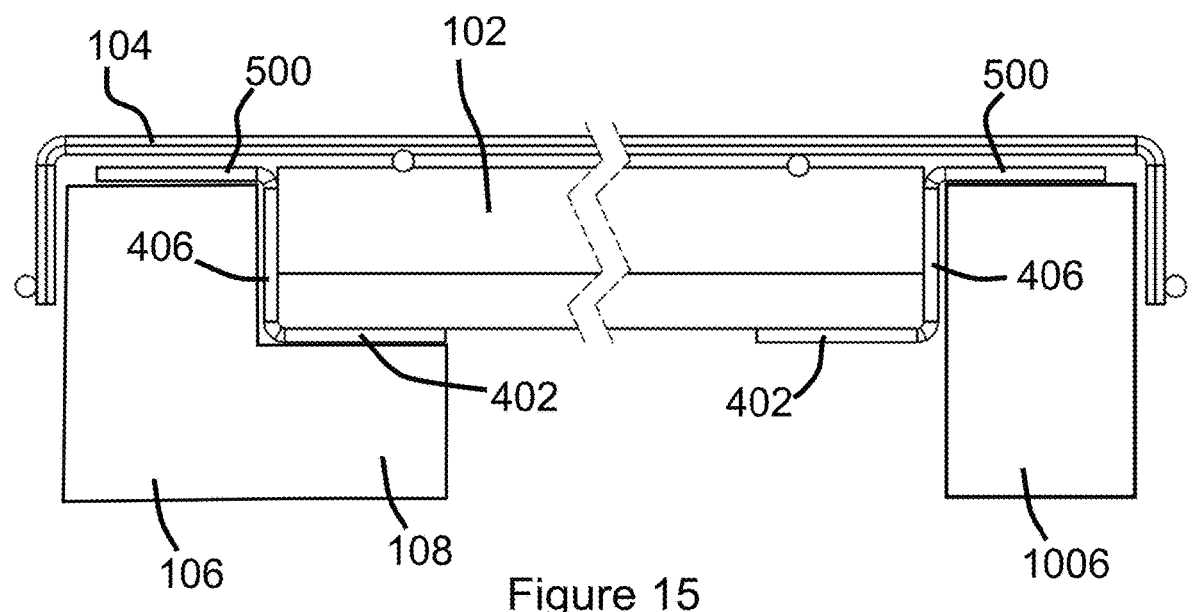
FIG. 15 representatively illustrates a side view of the decking system shown in FIG. 14 in accordance with an exemplary embodiment of the present technology.

Referring now to FIGS. 4 and 5, in an exemplary embodiment of the present technology, the horizontal support channel 102 may be modified to include a flange clip 400, 500 to facilitate use with other types of horizontal support rails 106. Each flanged clip 400, 500 may comprise a wall section 406 having a lower surface 402 extending outwardly away from a lower edge of the wall section 406 at an approximately ninety-degree angle and an upper surface 404 extending outwardly away from an upper edge of the wall section 406 in an opposite direction to the lower surface 402 at an approximately ninety-degree angle.

The lower surface 402 may be coupled or otherwise attached to the underside of the horizontal support channel 102 by any suitable method such as a weld or other mechanical connection. In one embodiment, and referring now to FIGS. 4 and 6-8, the lower surface 402 may comprise at least one ridge 408 that is configured to provide an enhanced location for connection between the flanged clip 400 and the horizontal support channel 102. For example, a pair of ridges 408 may be designed to facilitate a weld between the flanged clip 400 and the horizontal support channel 102.

The ridges 408 may comprise any suitable shape or geometry that provides a sufficient bonding area for the desired type of connection between the horizontal support channel 102 and the flanged clip 400. For example, in one embodiment, each ridge 408 may comprise an upwardly curving surface that is oriented perpendicular to the length of the horizontal support channel 102. In an alternative embodiment, the ridges 408 may comprise a series of recesses or indentations that are configured to receive at least a portion of the horizontal support channel 102 within the recesses. Alternatively, and referring now to FIGS. 5 and 11-13, the lower surface 402 may comprise a flat surface configured to generally conform to the parallel ends of the pair of sidewalls.

With reference now to FIGS. 4-15, the lower surface 402 may comprise any suitable size or shape. The size or shape may be determined according to a desired application for or material from which the flanged clip 400, 500 is made. For example, the lower surface 402 may comprise a length of between about one inch and about four inches and a width of between about one-half of an inch and about three inches. Larger dimensions may be selected in applications where heavier loads are expected.

The wall section 406 may extend upward from the lower surface 402 at a substantially right angle. The wall section 406 may extend upward for any suitable distance. For example, in one embodiment, a height of the wall section 406 may be about the same height as the horizontal support channel 102. In other embodiments, the height of the wall section 406 may be slightly greater than or less than the height of the horizontal support channel 102 to account for additional factors such as the mesh deck 104 and whether or not the mesh deck 104 will be flush with or overlap the horizontal support rail 106 when the system is installed and in use.

The wall section 406 may comprise vertical or angled side edges. For example, in one embodiment, the wall section 406 may comprise a smaller width near the lower surface 402 and a wider width at the upper surface 404. Accordingly, the side edges of the wall section 406 may be angled to create an increasing width as the wall section progresses upwardly from the lower surface 402 to the upper surface 404.

The upper surface 404 is configured to engage the horizontal support rail 106 and may comprise any suitable dimension or shape. For example, the upper surface 404 may comprise a generally rectangular shape having a length that is approximately the same width as the vertical support rail, such as between about three-quarters of an inch and about three inches. A width of the upper surface 404 may also comprise any suitable width that is at least as wide as the lower surface 402.

Referring now to FIGS. 4, 5, 8 and 13, in one embodiment the upper surface may further comprise an opening 410 configured to allow a fastener such as a screw or a bolt to pass through and connect the flanged clip 400, 500 to the horizontal support rail 106, 1006. For example, and with reference now to FIG. 10, a bolt 1002 may be used to affix or otherwise connect the flanged clip 400 and the horizontal support channel 102 to the horizontal support rail 1006.

The flanged clip 400, 500 may be formed by any suitable method or manufacturing process. For example, in one embodiment, the flanged clip 400, 500 may be formed from a single piece of hot rolled steel. In a first step, a substantially rectangular piece of steel of about three inches in width and about forty-eight inches in length may be cut or stamped to create a flat planform. The piece of steel may then be subjected to one or more bending or rolling operations to form the flanged clip 400, 500. The flanged clip 400, 500 may then be spot welded to an upper or lower edge of the horizontal support channel 102.

Referring now to FIGS. 9, 10, 14, and 15, in an exemplary embodiment of the present technology, the lower surface 402 of a first flanged clip 400, 500 is coupled to an underside of a first end of the horizontal support channel 102 and a second flanged clip 400, 500 is coupled to an underside of a second end of the horizontal support channel 102. The two flanged clips 400, 500 may then be positioned on a horizontal support rail 106. For example, the lower 402 may be configured to be positioned on or near the ledge 108 of a first type of horizontal support rail 106 and the lower surface 402 may be configured to extend away from and not have direct contact with a second type of horizontal support rail 1006 that does not comprise a ledge section.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology.

Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples. Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A flange clip for a support channel extending between two horizontal support rails, comprising:
   a vertically oriented wall section oriented to be positioned against a vertical surface of a first horizontal support rail;
   an upper surface extending outwardly away from an upper edge of the vertically oriented wall section at a substantially ninety-degree angle, wherein an underside of the upper surface is oriented to be positioned on an upward facing surface of the first horizontal support rail; and
   a lower surface extending outwardly away from a lower edge of the vertically oriented wall section at a substantially ninety-degree angle in an opposite direction as the upper surface, wherein the lower surface comprises an upward facing surface and the lower surface:
      is configured to receive a first end of the support channel; and
      comprises a ridge for bonding the lower surface to the first end of the support channel.

2. A flange clip for a support channel according to claim 1, wherein the ridge comprises an upwardly curving surface that is oriented perpendicular to a length of the support channel.

3. A flange clip for a support channel according to claim 2, wherein the lower surface further comprises a second ridge for bonding the lower surface to the first end of the support channel.

4. A flange clip for a support channel according to claim 3, wherein the second ridge comprises a second upwardly curving surface that is oriented perpendicular to a length of the support channel and spaced apart from the first ridge.

5. A flange clip for a support channel according to claim 1, wherein the wall section comprises angled side edges that create an increasing width as the wall section progresses upwardly from the lower surface to the upper surface.

6. A support channel for extending between a first and second horizontal support rail, comprising:
   a support channel comprising a generally "U" shaped body extending between opposite end sections wherein a pair of sidewalls are separated from each other by a gap and are substantially parallel to each other along a length of the generally "U" shaped body;
   a pair of flanged clips, each comprising:
      a vertically oriented wall section oriented to be positioned against a vertical surface of one horizontal support rail;
      an upper surface extending outwardly away from an upper edge of the vertically oriented wall section at a substantially ninety-degree angle, wherein an underside of the upper surface is oriented to be positioned on an upward facing surface of the horizontal support rail; and
      a lower surface extending outwardly away from a lower edge of the vertically oriented wall section at a substantially ninety-degree angle in an opposite direction to the upper surface, wherein:
         the lower surface of a first flanged clip is bonded to a first end section of the support channel; and
         the lower surface of a second flanged clip is bonded to a second end section of the support channel.

7. A support channel according to claim 6, wherein the lower surface of each flanged clip comprises a ridge for bonding the lower surface to a corresponding end section of the support channel.

8. A support channel according to claim 7, wherein the ridge comprises an upwardly curving surface that is oriented perpendicular to a length of the support channel.

9. A support channel according to claim 8, wherein the lower surface of each flanged clip further comprises a second ridge for bonding the lower surface to the corresponding end section of the support channel.

10. A support channel according to claim 9, wherein the second ridge comprises a second upwardly curving surface that is oriented perpendicular to a length of the support channel and spaced apart from the first ridge.

11. A support channel according to claim 6, wherein the vertically oriented wall section comprises angled side edges that create an increasing width as the wall section progresses upwardly from the lower surface to the upper surface.

\* \* \* \* \*